US012347933B2

(12) United States Patent
Wu et al.

(10) Patent No.: US 12,347,933 B2
(45) Date of Patent: Jul. 1, 2025

(54) BASE STATION ANTENNAS HAVING BROADBAND DECOUPLING RADIATING ELEMENTS INCLUDING METAMATERIAL RESONATOR BASED DIPOLE ARMS

(71) Applicant: Outdoor Wireless Networks LLC, Claremont, NC (US)

(72) Inventors: Bo Wu, Allen, TX (US); Yuemin Li, Jiangsu (CN); Peter Bisiules, LaGrange Park, IL (US)

(73) Assignee: Outdoor Wireless Networks LLC, Richardson, TX (US)

(*) Notice: Subject to any disclaimer, the term of this patent is extended or adjusted under 35 U.S.C. 154(b) by 0 days.

(21) Appl. No.: 18/837,066

(22) PCT Filed: Feb. 16, 2023

(86) PCT No.: PCT/US2023/013184
§ 371 (c)(1),
(2) Date: Aug. 8, 2024

(87) PCT Pub. No.: WO2023/167784
PCT Pub. Date: Sep. 7, 2023

(65) Prior Publication Data

US 2025/0141120 A1 May 1, 2025

(30) Foreign Application Priority Data

Mar. 1, 2022 (CN) ......................... 202210192172.8

(51) Int. Cl.
*H01Q 21/26* (2006.01)
*H01Q 1/24* (2006.01)
(Continued)

(52) U.S. Cl.
CPC ............. *H01Q 21/26* (2013.01); *H01Q 1/246* (2013.01); *H01Q 5/42* (2015.01); *H01Q 15/14* (2013.01); *H01Q 21/062* (2013.01)

(58) Field of Classification Search
CPC .......... H01Q 21/26; H01Q 1/246; H01Q 5/42; H01Q 15/14; H01Q 21/062
See application file for complete search history.

(56) References Cited

U.S. PATENT DOCUMENTS 6,734,827 B2 5/2004 Killen et al.
9,570,804 B2 2/2017 Shang et al.
(Continued)

FOREIGN PATENT DOCUMENTS

CN 111555030 A 8/2020
CN 112164869 A 1/2021
(Continued)

OTHER PUBLICATIONS

"International Search Report and Written Opinion of the International Searching Authority", International Application No. PCT/US2023/013184, May 19, 2023, 10 pp.
(Continued)

*Primary Examiner* — Hai V Tran
(74) *Attorney, Agent, or Firm* — Myers Bigel, P.A.

(57) ABSTRACT

Antennas include a reflector, a first radiating element that is configured to operate in a first operating frequency band, and a second radiating element that is configured to operate in a second operating frequency band that encompasses higher frequencies than the first operating frequency band. The first radiating element includes a first dipole radiator having a first dipole arm and a second dipole arm and a second dipole radiator having a third dipole arm and a fourth dipole arm. The first dipole arm includes a first widened conductive
(Continued)

section and a first narrowed conductive section that at least substantially surrounds the first widened conductive section.

23 Claims, 9 Drawing Sheets

(51) Int. Cl.

| | |
|---|---|
| ***H01Q 5/42*** | (2015.01) |
| ***H01Q 15/14*** | (2006.01) |
| ***H01Q 21/06*** | (2006.01) |

(56) References Cited

U.S. PATENT DOCUMENTS

| | | | | |
|---|---|---|---|---|
| 10,439,285 | B2 * | 10/2019 | Isik | H01Q 19/108 |
| 10,770,803 | B2 | 9/2020 | Varnoosfaderani et al. | |
| 11,018,437 | B2 | 5/2021 | Tang et al. | |
| 11,545,754 | B2 * | 1/2023 | Chen | H03H 7/42 |
| 2009/0213010 | A1 | 8/2009 | Chou | |
| 2015/0042513 | A1 | 2/2015 | Foo | |
| 2016/0285169 | A1 | 9/2016 | Shooshtari et al. | |
| 2018/0166782 | A1 | 6/2018 | Farzaneh et al. | |
| 2018/0323513 | A1 * | 11/2018 | Varnoosfaderani | H01Q 21/062 |
| 2020/0127389 | A1 * | 4/2020 | Li | H01Q 25/001 |
| 2021/0359414 | A1 * | 11/2021 | Sundararajan | H01Q 1/521 |
| 2023/0017375 | A1 * | 1/2023 | Wu | H01Q 5/42 |
| 2023/0056237 | A1 | 2/2023 | Hou et al. | |
| 2023/0163486 | A1 * | 5/2023 | Varnoosfaderani | H01Q 21/26 343/797 |
| 2023/0361475 | A1 * | 11/2023 | Sun | H01Q 5/48 |

FOREIGN PATENT DOCUMENTS

| | | | |
|---|---|---|---|
| CN | 112186333 | A | 1/2021 |
| CN | 112186341 | A | 1/2021 |
| CN | 112290199 | A | 1/2021 |
| CN | 112421219 | A | 2/2021 |
| CN | 112768895 | A | 5/2021 |
| CN | 112787061 | A | 5/2021 |
| CN | 112821044 | A | 5/2021 |
| CN | 213304351 | U | 5/2021 |
| WO | 2021194961 | A1 | 9/2021 |

OTHER PUBLICATIONS

Zhu, Yufeng , et al., “Integration of 5G Rectangular MIMO Antenna Array and GSM Antenna for Dual-Band Base Station Applications”, IEEE Access, vol. 8, Mar. 30, 2020, pp. 63175-63187.

* cited by examiner

BASE STATION ANTENNAS HAVING BROADBAND DECOUPLING RADIATING ELEMENTS INCLUDING METAMATERIAL RESONATOR BASED DIPOLE ARMS

CROSS-REFERENCE TO RELATED APPLICATIONS

The present application is a 35 U.S.C. § 371 national stage application of PCT Application No. PCT/US2023/013184, filed on Feb. 16, 2023, which itself claims priority to Chinese Patent Application Serial No. 202210192172.8, filed Mar. 1, 2022, the entire contents of both of which are incorporated herein by reference.

BACKGROUND

The present invention generally relates to radio communications and, more particularly, to base station antennas for cellular communications systems.

Cellular communications systems are well known in the art. In a cellular communications system, a geographic area is divided into a series of regions that are referred to as “cells” which are served by respective macro cell base stations. The macro cell base station may include one or more antennas that are configured to provide two-way radio frequency (“RF”) communications with mobile subscribers that are within the cell served by the base station. In many cases, each macro cell base station is divided into “sectors.” In one common configuration, a hexagonally shaped cell is divided into three 120° sectors in the azimuth plane, and each sector is served by one or more base station antennas that generate radiation patterns (also referred to herein as “antenna beams”) that have azimuth Half Power Beamwidths (“HPBW”) of approximately 65°. Each base station antenna may include one or more linear or planar phased arrays of radiating elements, where each array generates one or more antenna beams. Modern cellular communications systems also commonly include small cell base stations that are implemented within each macro cell that provide additional capacity for portions of the macro cell that have high traffic volumes.

In order to accommodate the increasing volume of cellular communications, cellular operators have added cellular service in a variety of new frequency bands. While in some cases it is possible to use a single array of so-called “wide-band” or “ultra-wide-band” radiating elements to provide service in multiple frequency bands, in other cases it is necessary to use different arrays of radiating elements to support service in the different frequency bands. Accordingly, most macro cells employ multi-band base station antennas that include arrays of radiating elements that operate in two, three or more different operating frequency bands. For example, base station antennas are now being deployed that include two linear arrays of “low-band” radiating elements that operate in some or all of the 694-960 MHz frequency band, two linear arrays of first “mid-band” radiating elements that operate in some or all of the 1427-2690 MHz frequency band and two linear arrays of second mid-band radiating elements that operate in some or all of the 1695-2690 MHz frequency band. These linear arrays are typically located in close proximity to each other in order to reduce the width of the base station antenna. Unfortunately, the closely positioned arrays can interact with each other, which may degrade performance or make it necessary to position the arrays farther apart, which can make it challenging to meet customer requirements relating to the width of the antenna.

SUMMARY

Pursuant to embodiments of the present invention, antennas (e.g., a base station antenna) are provided that include a reflector, a first radiating element extending forwardly from the reflector that is configured to operate in a first operating frequency band, and a second radiating element extending forwardly from the reflector that is configured to operate in a second operating frequency band that encompasses higher frequencies than the first operating frequency band. The first radiating element includes a first dipole radiator having a first dipole arm and a second dipole arm and a second dipole radiator having a third dipole arm and a fourth dipole arm, and the first dipole arm includes a first widened conductive section and a first narrowed conductive section that at least substantially surrounds the first widened conductive section, where the first widened conductive section is substantially separated from the first narrowed conductive section by a gap where no conductive material is present.

In some embodiments, the first dipole arm may further include a second widened conductive section and a second narrowed conductive section that at least substantially surrounds the second widened conductive section, where the second widened conductive section is substantially separated from the second narrowed conductive section by a gap where no conductive material is present.

In some embodiments, the first widened conductive section and the first narrowed conductive section that at least substantially surrounds the first widened conductive section may comprise at least part of a first complementary split ring resonator, the second widened conductive section and the second narrowed conductive section that at least substantially surrounds the second conductive widened section may comprise at least part of a second complementary split ring resonator, and the first complementary split ring resonator may be electrically connected to the second complementary split ring resonator.

In some embodiments, the first widened conductive section and the first narrowed conductive section that at least substantially surrounds the first widened conductive section may together form at least part of a first complementary split ring resonator. In such embodiments, the first complementary split ring resonator may further include a second widened conductive section that substantially surrounds the first narrowed conductive section, where the first narrowed conductive section is substantially separated from the second widened conductive section by a second gap where no conductive material is present.

In some embodiments, the first widened conductive section and the first narrowed conductive section that at least substantially surrounds the first widened conductive section may form a parallel inductor-capacitor (“LC”) circuit. The parallel LC circuit may act as an open circuit at a frequency within the second operating frequency band.

In some embodiments, the first complementary split ring resonator may have a first length and the second complementary split ring resonator may have a second length that exceeds the first length.

In some embodiments, a first resonant frequency of the first complementary split ring resonator may be within the second operating frequency band and a second resonant frequency of the second complementary split ring resonator may be within the second operating frequency band, the second resonant frequency being different than the first resonant frequency. In some embodiments, the first resonant frequency may be within a lower half of the second operating frequency band and the second resonant frequency may be within an upper half of the second operating frequency band. The first dipole arm may further include a third complementary split ring resonator that is electrically connected to the first and second complementary split ring resonators, and a third resonant frequency of the third complementary split ring resonator may be within the second operating frequency band and is different than both the first resonant frequency and the second resonant frequency. In some embodiments, a first narrowed conductive connector may connect the first complementary split ring resonator to the second complementary split ring resonator, and a second narrowed conductive connector may connect the second complementary split ring resonator to the third complementary split ring resonator.

In some embodiments, the third complementary split ring resonator include may a third widened conductive section and a third narrowed conductive section that at least substantially surrounds the third widened conductive section, and the first narrowed conductive connector may connect both the first widened conductive section and the first narrowed conductive section to both the second widened conductive section and the second narrowed conductive section, and the second narrowed conductive connector may only connect the second narrowed conductive section to the third narrowed conductive section. In some embodiments, the first dipole arm may further include a fourth complementary split ring resonator that includes a fourth widened conductive section and a fourth narrowed conductive section that at least substantially surrounds the fourth widened conductive section and a third narrowed conductive connector that connects the third complementary split ring resonator to the fourth complementary split ring resonator, and the third narrowed conductive connector may connect both the third widened conductive section and the third narrowed conductive section to both the fourth widened conductive section and the fourth narrowed conductive section.

In some embodiments, the first dipole arm may include a plurality of complementary split ring resonators, and respective resonant frequencies of the complementary split ring resonators may be spread across the second operating frequency band.

In some embodiments, a width of the first widened conductive section may be at least three times a width of the first narrowed conductive section.

In some embodiments, the first widened conductive section and the first narrowed conductive section may both be implemented in a first metal layer of a printed circuit board. In some embodiments, the printed circuit board may include first and second metallization layers that are separated by a dielectric substrate, and the first and second metallization layers may each include at least a portion of a complementary split ring resonator.

In some embodiments, the first dipole arm may comprise a closed loop and/or may have a generally oval shape.

In some embodiments, the first and second dipole arms may be configured to be substantially transparent to RF signals in the second operating frequency band.

Pursuant to further embodiments of the present invention, antennas are provided that include a reflector, a first radiating element extending forwardly from the reflector that is configured to operate in a first operating frequency band, and a second radiating element extending forwardly from the reflector that is configured to operate in a second operating frequency band that encompasses higher frequencies than the first operating frequency band. The first radiating element includes a first dipole radiator having a first dipole arm and a second dipole arm and a second dipole radiator having a third dipole arm and a fourth dipole arm, and each of the first through fourth dipole arms includes at least one metamaterial resonator.

In some embodiments, each metamaterial resonator may be a metamaterial ring resonator. In some embodiments, each metamaterial ring resonator may be a complementary split ring resonator.

In some embodiments, each complementary split ring resonator may include a widened conductive section and a narrowed conductive section that at least substantially surrounds the widened conductive section, where the widened conductive section is substantially separated from the narrowed conductive section by a gap where no conductive material is present.

In some embodiments, each complementary split ring resonator may include a widened conductive section, a narrowed conductive section that at least substantially surrounds the widened conductive section, and a conductive region that substantially surrounds the narrowed conductive section.

In some embodiments, each complementary split ring resonator may act as an open circuit at a frequency within the second operating frequency band.

In some embodiments, each of the first through fourth dipole arms may include at least a first complementary split ring resonator and a second complementary split ring resonator that is electrically connected to the first complementary split ring resonator.

In some embodiments, the first complementary split ring resonator has a first resonant frequency that is within a lower half of the second operating frequency band and the second complementary split ring resonator has a second resonant frequency that is within an upper half of the second operating frequency band.

In some embodiments, each of the first through fourth dipole arms includes a plurality of complementary split ring resonators that are electrically connected to one another, and wherein resonant frequencies of the plurality of complementary split ring resonators are spread across the second operating frequency band.

In some embodiments, a width of the widened conductive section may be at least three times a width of the narrowed conductive section.

DETAILED DESCRIPTION

Figure 1:
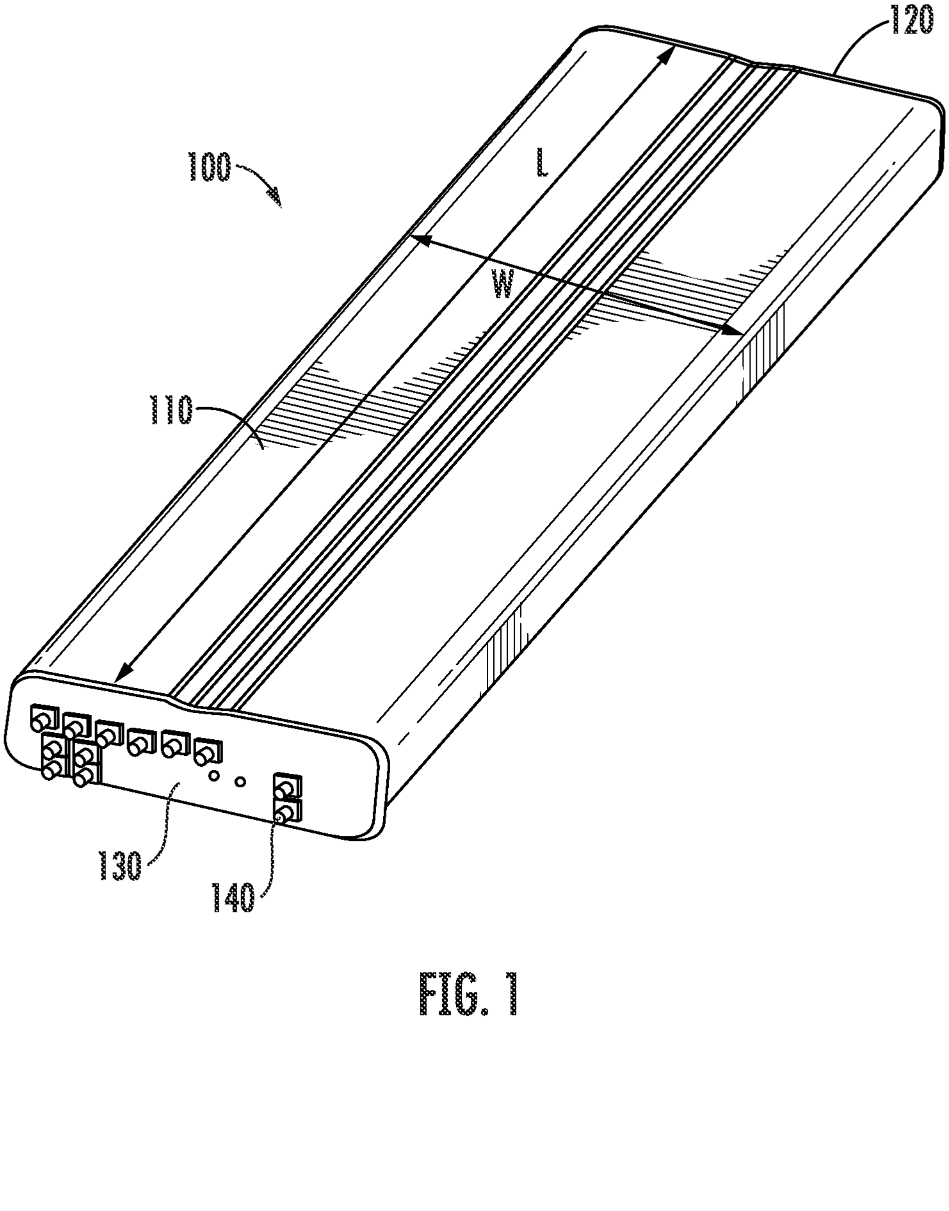
FIG. 1 is a perspective view of a base station antenna according to embodiments of the present invention.

Embodiments of the present invention relate generally to radiating elements for multi-band base station antennas and to related base station antennas. The multi-band base station antennas according to embodiments of the present invention may, for example, support two, three or more major air-interface standards in two, three or more cellular frequency bands and allow wireless operators to reduce the number of antennas deployed at base stations, lowering tower leasing costs.

A challenge in the design of multi-band base station antennas is reducing the effect of scattering of the RF signals at one frequency band by the radiating elements of other frequency bands. Scattering is undesirable as it may negatively impact the shape of the antenna beam in both the azimuth and elevation planes. For example, in the azimuth plane, scattering can impact the beamwidth, beam shape, pointing angle, gain and front-to-back ratio, typically in undesirable ways. Moreover, the impact of scattering may vary significantly with frequency, which may make it hard to compensate. The radiating elements according to certain embodiments of the present invention may be designed to have reduced impact on the antenna pattern of closely located radiating elements that transmit and receive signals in other frequency bands (i.e., reduced scattering). Importantly, the radiating elements may exhibit reduced scattering over large bandwidths. Radiating elements that exhibit reduced scattering in the operating frequency bands of nearby radiating elements may be referred to herein as "cloaking" and/or as "decoupling" radiating elements.

Cloaking low-band radiating elements are known in the art. For example, U.S. Pat. No. 9,570,804 discloses a low-band radiating element that operates in the 696-960 MHz frequency band that includes dipole arms that are formed as a series of RF chokes in order to render the low-band radiating element substantially transparent to RF energy in the 1.7-2.7 GHz frequency band. U.S. Pat. No. 10,439,285 and 10,770,803 each disclose low-band radiating elements that operate in the 696-960 MHz frequency band that include dipole arms that are formed as a series of widened segments that are coupled by narrow inductive segments, which may be implemented as small meandered trace segments on a printed circuit board. In each case, the narrow inductive segments act as high impedance elements for RF energy in the 1.7-2.7 GHz frequency band, rendering the low-band radiating elements substantially transparent to RF energy in that frequency range. As another example, U.S. Pat. No. 11,018,437 discloses a low-band radiating element that operates in the 696-960 MHz frequency band that includes two dipole arms that are substantially transparent to RF energy in the 1.7-2.7 GHz frequency band and another two dipole arms that are substantially transparent to RF energy in the 3.3-4.2 GHz frequency band. Additional cloaking radiating element designs are disclosed in Chinese Patent No. CN 112787061A, Chinese Patent No. CN 112164869A, Chinese Patent No. CN 112290199A, Chinese Patent No. CN 111555030A, Chinese Patent No. CN 112186333A, Chinese Patent No. CN 112186341A, Chinese Patent No. CN 112768895A, Chinese Patent No. CN 112821044A, Chinese Patent No. CN 213304351U, and Chinese Patent No. CN 112421219A.

Pursuant to embodiments of the present invention, multi-band base station antennas are provided that have at least one or more arrays of first radiating elements that transmit and receive signals in a first frequency operating band and one or more arrays of second radiating elements that transmit and receive signals in a second, different operating frequency band that encompasses higher frequencies. Each first radiating element may be a broadband decoupling radiating element that has dipole radiators that are substantially transparent to RF energy in the second operating frequency band. The dipole radiators may be implemented in a "cross" arrangement to form a pair of center-fed+/−45° dipole radiators. Each dipole radiator may comprise a pair of dipole arms, and each dipole arm may include a plurality of electrically connected metamaterial resonators, such as split ring resonators or complementary split ring resonators. For example, the dipole arms may be formed on a printed circuit board (or multiple printed circuit boards), with each dipole arm including two or more complementary split ring resonators formed on a first conductive layer of the printed circuit board. The total electrical length of each dipole arm may be about ¼ of a wavelength corresponding to a center frequency of the first operating frequency band.

The resonant frequency of each metamaterial resonator may be within the second operating frequency band. In some embodiments, at least some of the metamaterial resonators may be designed to have different resonant frequencies. For example, each dipole arm may include two or more metamaterial resonators that have resonant frequencies that are spread across the second operating frequency band. As a result, the frequency response of each dipole arm may exhibit nulls at a variety of frequencies within the second operating frequency band, which may broaden the frequency range over which the dipole arm is substantially transparent or "cloaking" to frequencies within the second operating frequency band. This may be important if the first radiating elements are positioned adjacent second radiating elements that have an extended operating frequency band (e.g., the 1427-2690 MHz frequency band) or are positioned adjacent radiating elements that operate in different frequency bands (e.g., radiating elements that operate in the 2.3-2.7 GHz frequency band and radiating elements that operate in the 3.1-4.2 GHz frequency band).

Pursuant to some embodiments of the present invention, antennas are provided that include a first radiating element that is configured to operate in a first operating frequency band and a second radiating element that is configured to operate in a second, higher, operating frequency band. The first radiating element includes first through fourth dipole arms. Each dipole arm includes a first widened conductive section and a first narrowed conductive section that at least substantially surrounds the first widened conductive section.

Pursuant to other embodiments of the present invention, antennas are provided that include a first radiating element that is configured to operate in a first operating frequency band and a second radiating element that is configured to operate in a second, higher, operating frequency band. The first radiating element includes first through fourth dipole arms, where each dipole arm includes a plurality of metamaterial resonators such as, for example, split ring resonators or complementary split ring resonators.

Embodiments of the present invention will now be described in further detail with reference to the attached figures.

Figure 2:
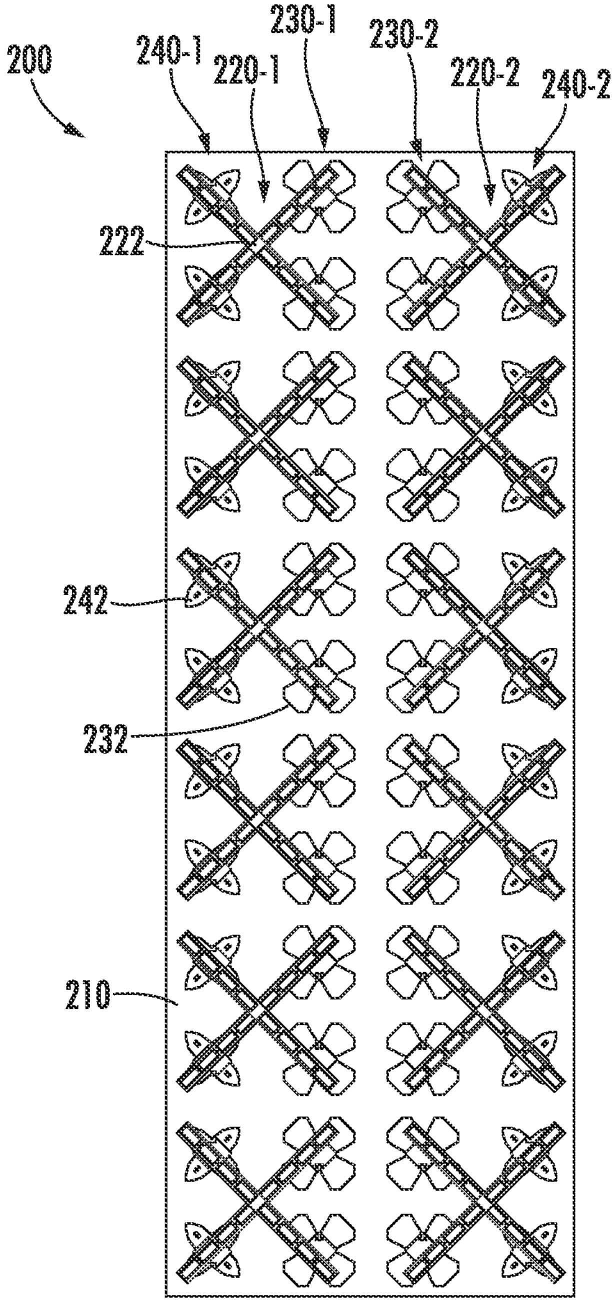
FIG. 2 is a schematic front view of the base station antenna of FIG. 1 with the radome removed.

FIGS. 1 and 2 illustrate a base station antenna 100 according to certain embodiments of the present invention. In particular, FIG. 1 is a perspective view of the antenna 100, while FIG. 2 is a front view of the antenna 100 with the radome thereof removed to illustrate the antenna assembly 200 of the antenna 100. In the description that follows, the antenna 100 and the radiating elements included therein will be described using terms that assume that the antenna 100 is mounted for normal use on a tower with a longitudinal axis of the antenna 100 extending along a vertical axis and the front surface of the antenna 100 mounted opposite the tower pointing toward the coverage area for the antenna 100.

As shown in FIGS. 1-2, the base station antenna 100 is an elongated structure that extends along a longitudinal axis L and that has a width W. The base station antenna 100 may have a tubular shape with a generally rectangular cross-section. The antenna 100 includes a radome 110 and a top end cap 120. The antenna 100 also includes a bottom end cap 130 which includes a plurality of connectors 140 such as RF ports mounted therein. The antenna 100 is typically mounted in a vertical configuration (i.e., the longitudinal axis L may be generally perpendicular to a plane defined by the horizon) when the antenna 100 is mounted for normal operation. The radome 110, top cap 120 and bottom cap 130 may form an external housing for the antenna 100. An antenna assembly 200 is contained within the external housing.

FIG. 2 is a front view of the antenna assembly 200 of base station antenna 100. As shown in FIG. 2, the antenna assembly 200 includes a reflector 210 and a plurality of radiating elements 222, 232, 242. Various mechanical and electronic components (not shown) may be mounted behind the reflector 210 within the housing such as, for example, phase shifters, remote electronic tilt units, mechanical linkages, controllers, diplexers, and the like. The reflector 210 may comprise or include a metallic surface (e.g., a sheet of aluminium) that reflects RF energy that is emitted backwardly by the radiating elements 222, 232, 242 in the forward direction, and may also serve as a ground plane for the radiating elements 222, 232, 242.

Each radiating element 222, 232, 242 may be a dual-polarized radiating element. In the depicted embodiment, each radiating element 222, 232, 242 is implemented as a so-called cross-dipole radiating element that includes first and second dipole radiators that are configured to transmit and receive RF signals having −45° and +45° polarizations, respectively. The radiating elements 222, 232, 242 are mounted to extend forwardly from the reflector 210 (the radiating elements extend upwardly from the reflector 210 in the view of FIG. 2, but it will be appreciated that the antenna assembly will be rotated approximately 90° from the orientation shown in FIG. 2 when the antenna 100 is mounted for normal use).

The radiating elements include low-band radiating elements 222, first mid-band radiating elements 232 and second mid-band radiating elements 242. The low-band radiating elements 222 are mounted in two columns to form two linear arrays 220-1, 220-2 of low-band radiating elements 222. The first mid-band radiating elements 232 are also mounted in two columns to form two linear arrays 230-1, 230-2 of first mid-band radiating elements 232. The second mid-band radiating elements 242 may also be mounted in two columns to form two linear arrays 240-1, 240-2 of second mid-band radiating elements 242. It will be appreciated that the number of arrays of radiating elements may be varied from what is shown in FIG. 2, as may the number of radiating elements in each array, and the relative positions of the arrays. It should be noted that herein like elements may be referred to individually by their full reference numeral (e.g., linear array 230-2) and may be referred to collectively by the first part of their reference numeral (e.g., the linear arrays 230).

At least some of the low-band radiating elements 222 in each low-band linear array 220 are in close proximity to both one or more first mid-band radiating elements 232 and to one or more second mid-band radiating elements 242. In fact, in the depicted embodiment, each low-band radiating element 222 "overlaps" both a first mid-band radiating element 232 and a second mid-band radiating element 242. Herein, one radiating element is considered to "overlap" another radiating element if an axis that is perpendicular to a plane defined by a reflector on which the two radiating elements are mounted passes through both radiating elements.

The low-band radiating elements 222 may be configured to transmit and receive signals in a first frequency band. In some embodiments, the first frequency band may comprise the 617-960 MHz frequency range or a portion thereof (e.g., the 617-896 MHz frequency band, the 696-960 MHz frequency band, etc.). The first mid-band radiating elements 232 may be configured to transmit and receive signals in a second frequency band that is different from the first frequency band. In some embodiments, the second frequency band may comprise the 1427-2690 MHz frequency range or a portion thereof (e.g., the 1710-2200 MHz frequency band, the 2300-2690 MHz frequency band, etc.). The second mid-band radiating elements 242 may be configured to transmit and receive signals in a third frequency band that is different than both the first frequency band and the second frequency band. In some embodiments, the third frequency band may comprise the 1695-2690 MHz frequency range or a portion thereof (e.g., the 1710-2200 MHz frequency band, the 2300-2690 MHz frequency band, etc.). The second and third frequency bands may be at higher frequencies than the first frequency band. The second and third frequency bands may or may not overlap. For example, in another example embodiment the second frequency band may be the 2300-2690 MHz frequency band and the third frequency band may be the 3.1-4.2 GHz frequency band or a portion thereof.

The low-band linear arrays 220 may or may not be used to transmit and receive signals in the same portion of the first frequency band. For example, in one embodiment, the low-band radiating elements 222 in the first linear array 220-1 may be used to transmit and receive signals in the 700 MHz frequency band and the low-band radiating elements 222 in the second linear array 220-2 may be used to transmit and receive signals in the 800 MHz frequency band. In other embodiments, the low-band radiating elements 222 in both the first and second linear arrays 220-1, 220-2 may be used to transmit and receive signals in the same frequency band to support the use of multi-input-multi-output ("MIMO") communication techniques. The first and second mid-band radiating elements 232, 242 in the first and second mid-band arrays 230, 240 may similarly have any suitable configuration. As noted above, the radiating elements 222, 232, 242 may be dual polarized radiating elements, and hence each array 220, 230, 240 may be used to form a pair of antenna beams, namely an antenna beam for each of the two polarizations at which the dual-polarized radiating elements are designed to transmit and receive RF signals.

While not shown in FIG. 2, the radiating elements 222, 232, 242 may be mounted on feed boards that couple RF signals to and from the individual radiating elements 222, 232, 242. One or more radiating elements 222, 232, 242 may be mounted on each feed board. Cables may be used to connect each feed board to other components of the antenna such as diplexers, phase shifters or the like.

Cellular network operators are interested in deploying antennas that have a large number of arrays of radiating elements in order to reduce the number of base station antennas required per base station. However, increasing the number of arrays typically increases the width of the antenna. Both the weight and wind loading of a base station antenna increase with increasing width, and thus wider base station antennas tend to require structurally more robust antenna mounts and antenna towers, both of which can significantly increase the cost of a base station. Accordingly, cellular network operators may place limitations on the widths of base station antennas (where the limits may depend on the application for the antenna). For example, for many applications, cellular network operators may require that the width of a base station antenna be below 500 mm.

The width of a multi-band base station antenna may be reduced by decreasing the separation between adjacent arrays of radiating elements. However, as the separation is reduced, increased coupling between the radiating elements of the different arrays occurs, and this increased coupling may impact the shapes of the antenna beams generated by the arrays in undesirable ways. For example, a low-band cross-dipole radiating element will typically have dipole radiators that have an electrical length that is approximately ½ a wavelength of the center frequency of the designed operating frequency band for the radiating element. Each dipole radiator has two dipole arms, and hence each dipole arm has an electrical length that is approximately ¼ a wavelength of the center frequency of the designed operating frequency band. If the low-band radiating element is designed to operate in the 696-960 MHz frequency band and the mid-band radiating element is designed to operate in the 1427-2690 MHz frequency band, the each dipole arm of the low-band radiating element radiator will have a length that is ½ a wavelength of a frequency within the operating frequency band of the mid-band radiating element, and hence RF energy transmitted by the mid-band radiating elements will tend to couple to the low-band radiating elements since such RF energy will be resonant in a ½ wavelength dipole arm.

When mid-band RF energy couples to the dipole arms of a low-band radiating element, mid-band currents are induced on the dipole arms. Such induced currents are particularly likely to occur when the low-band and mid-band radiating elements are designed to operate in frequency bands that include frequencies that are separated by about a factor of two (or four), since a low-band dipole arm having a length that is a quarter wavelength of the center frequency of the low-band operating frequency band will, in that case, have a length of approximately a half wavelength (or a full wavelength) of frequencies within the higher operating frequency band. The induced currents generate mid-band RF radiation that is emitted from the low-band dipole arms. The mid-band RF energy emitted from the dipole arms of the low-band resonating element distorts the antenna beam of the mid-band arrays since the radiation is being emitted from a different location than intended. The greater the extent that mid-band currents are induced on the low-band dipole arms, the greater the impact on the characteristics of the antenna beams generated by the mid-band arrays.

The low-band radiating elements 222 according to embodiments of the present invention may be designed to be substantially transparent to RF energy emitted by the mid-band radiating elements 232, 242. As such, even if the mid-band radiating elements 232, 242 are in close proximity to the low-band radiating elements 222, the above-discussed undesired coupling of mid-band RF energy onto the low-band radiating elements 222 may be significantly reduced. Moreover, the low-band radiating elements 222 may be transparent to RF energy over a very wide bandwidth. For example, in some embodiments, the low-band radiating elements 222 may be substantially transparent to RF energy across the full 1427-2690 MHz frequency band.

Figure 3A:
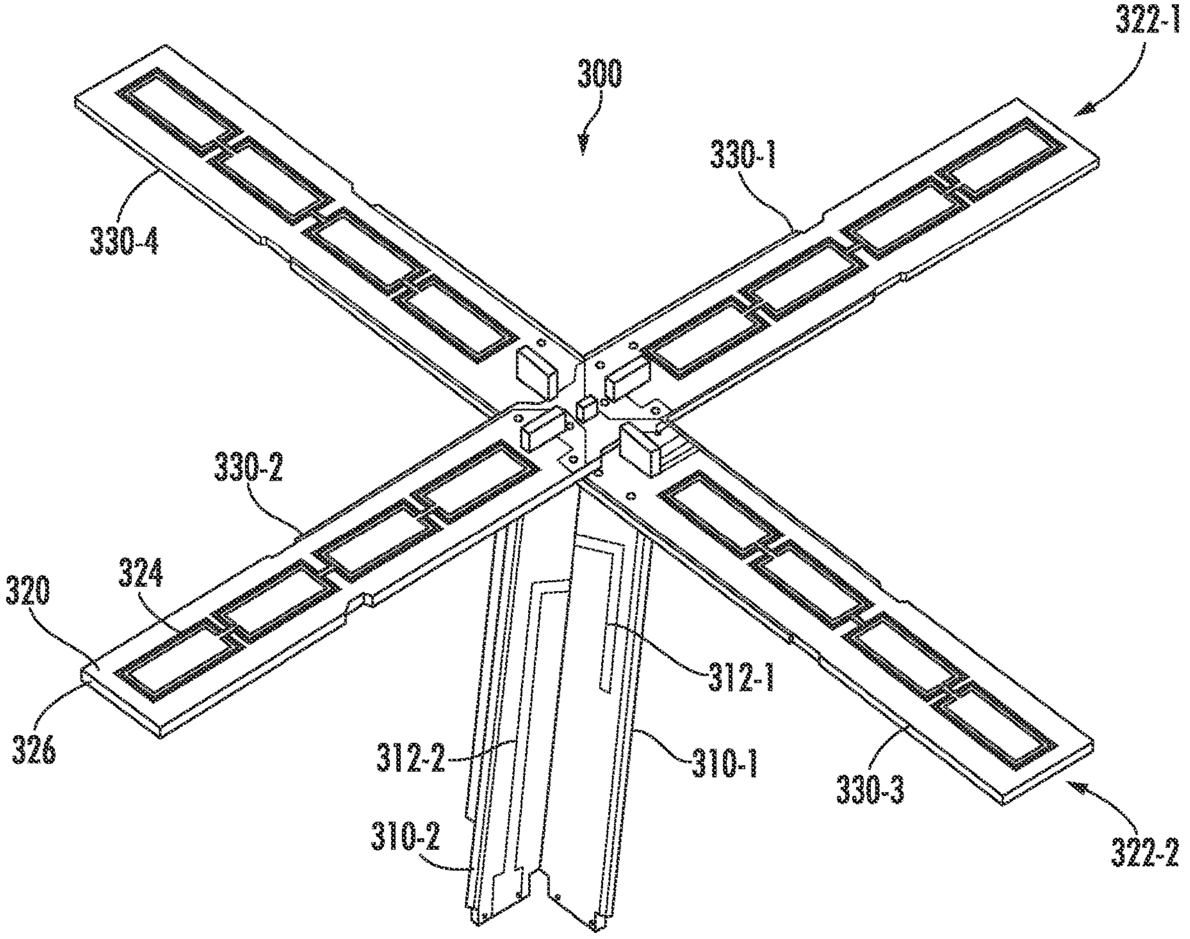
FIG. 3A is an enlarged schematic perspective view of one of the low-band radiating elements of the base station antenna of FIGS. 1-2.
Figure 3B:
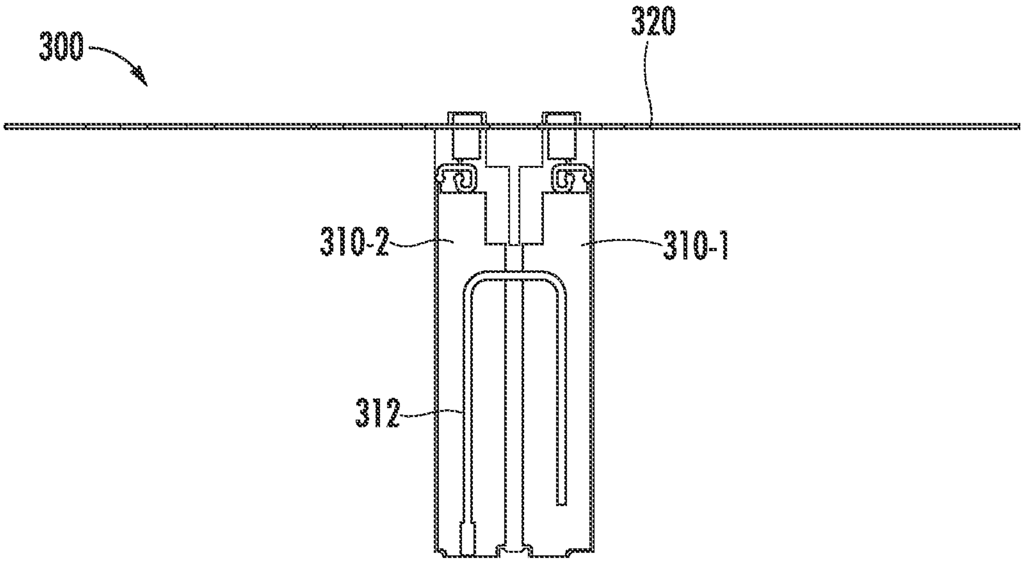
FIG. 3B is a side view of the low-band radiating element of FIG. 3A.
Figure 3C:
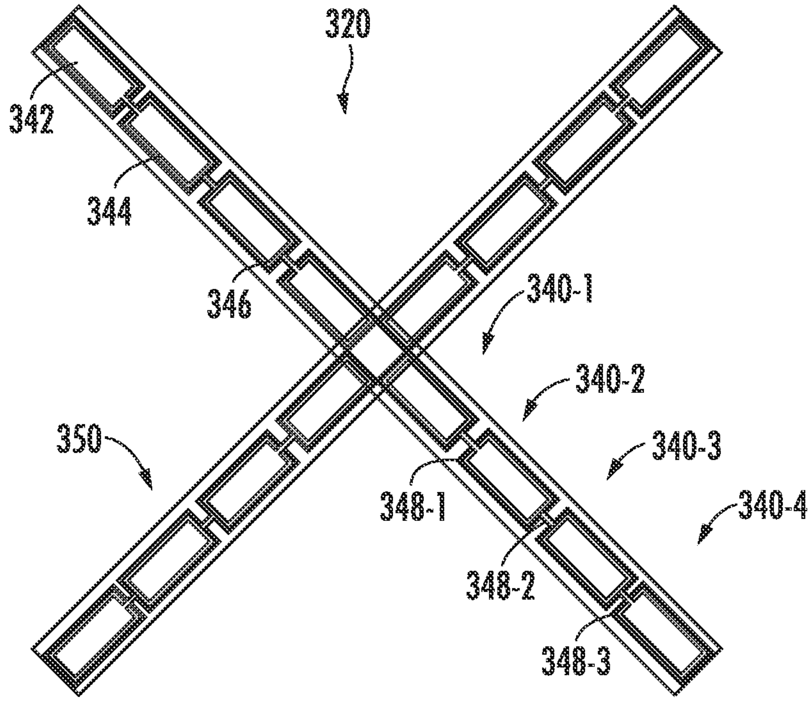
FIG. 3C is an enlarged plan view of the dipole radiator printed circuit board of the low-band radiating element of FIG. 3A.
Figure 3D:
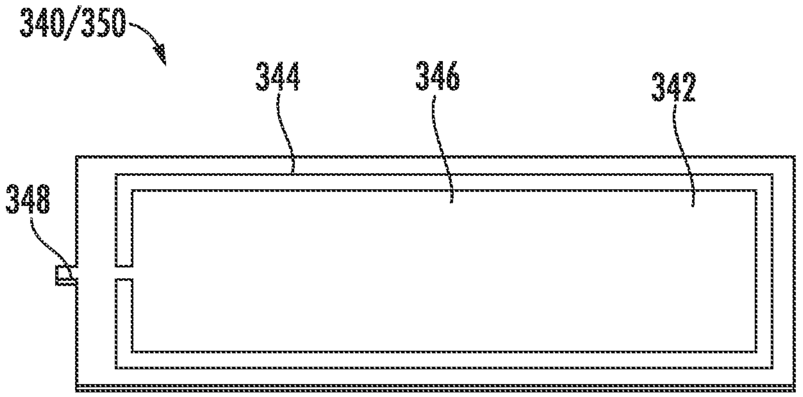
FIG. 3D is an enlarged plan view of one of the complementary split ring resonators included in the dipole arms of the low-band radiating element of FIG. 3A.
Figure 3E:
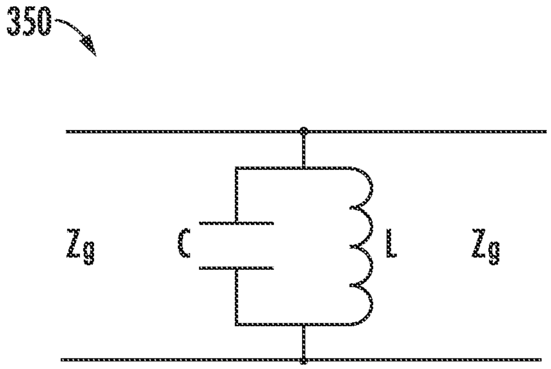
FIG. 3E is a circuit diagram illustrating the equivalent circuit of each complementary split ring resonator.

FIGS. 3A-3C illustrate a low-band radiating element 300 according to embodiments of the present invention that may be used to implement the low-band radiating elements 222 of base station antenna 100. In particular, FIGS. 3A and 3B are schematic perspective and side views, respectively, of the radiating element 300, while FIG. 3C is an enlarged front view of a dipole radiator printed circuit board included in radiating element 300. FIG. 3D is an enlarged plan view of one of the complementary split ring resonators that is included in radiating element 300 and FIG. 3E is a circuit diagram of the complementary split ring resonator of FIG. 3D.

Referring to FIGS. 3A-3C, the low-band radiating element 300 includes a pair of feed stalks 310, and a dipole radiator printed circuit board 320. The dipole radiator printed circuit board 320 may comprise a single printed circuit board or may comprise multiple printed circuit boards. First and second dipole radiators 322-1, 322-2 are formed on the dipole radiator printed circuit board 320. The first dipole radiator 322-1 includes first and second dipole arms 330-1, 330-2, and the second dipole radiator 322-2 includes third and fourth dipole arms 330-3, 330-4. The dipole radiators 322-1, 322-2 may be implemented in a "cross" arrangement to form a pair of center-fed slant +/−45° dipole radiators 322.

The feed stalks 310 may each comprise a printed circuit board that has RF transmission lines 312 formed thereon. These RF transmission lines 312 carry RF signals between a feed board (not shown) that is mounted on the reflector 210 and the dipole radiators 322. A first of the feed stalks 310-1 may include a front slit and the second of the feed stalks 310-2 includes a back slit. These slits allow the two feed stalks 310 to be assembled together to form a forwardly extending column that has an X-shape when viewed from the front. Rear portions of each feed stalk 310 may include projections that are inserted through slits in the feed board (not shown) to mount the radiating element 300 thereon. The RF transmission lines 312 on the respective feed stalks 310 may center feed the dipole radiators 322-1, 322-2.

RF signals may be coupled to and from the dipole radiators 322 via the feed stalks 310-1, 310-2. The first RF transmission line 312-1 on the feed stalk 310-1 may be galvanically or capacitively coupled to the first dipole radiator 322-1, and the second RF transmission line 312-2 on the feed stalk 310-2 may be galvanically or capacitively coupled to the second dipole radiator 322-2. Each dipole radiator 322 may be center fed meaning that RF signals are coupled from the feed stalks 310 to the base of each dipole arm 330 (i.e., the portion of the dipole arm 330 closest to the center of the radiating element 300). FIG. 3B illustrates one possible design for the feed stalks 310-1, 310-2, where each feed stalk 310 includes an RF transmission line 312 in the form of a hook balun. RF signals input to each feed stalk 310 are capacitively coupled to the dipole arms 330.

The azimuth half power beamwidths of each low-band radiating element 300 may be in the range of 55 degrees to 85 degrees. In some embodiments, the azimuth half power beamwidth of each low-band radiating element 300 may be approximately 65 degrees in the center of the operating frequency band for the low-band radiating element 300.

Each dipole arm 330 may be between approximately 0.2 to 0.35 of an operating wavelength in length, where the "operating wavelength" refers to the wavelength corresponding to a center frequency of the operating frequency band of the radiating element 300. For example, if the low-band radiating elements 300 are designed to transmit and receive signals across the 694-960 MHz frequency band, then the center frequency of the operating frequency band would be 827 MHz and the corresponding operating wavelength would be 36.25 cm.

The dipole radiator printed circuit board 320 includes a dielectric substrate 326 that has a first conductive layer 324 formed on a front side thereof. A second conductive layer may optionally be formed on a rear side of dielectric substrate 326, as will be discussed in greater detail below. The first conductive layer 324 may comprise a patterned copper layer in example embodiments, and may be referred to herein as a "metal layer." The dipole radiator printed circuit board 320 may also include a protective dielectric coating (not shown) that covers and protects the first metal layer 324. The first metal layer 324 may form each dipole arm 330.

The first dipole radiator 322-1 extends along a first axis and the second dipole radiator 322-2 extends along a second axis that is generally perpendicular to the first axis 322-1. Consequently, the first and second dipole radiators 322-1, 322-2 are arranged in the general shape of a cross. Dipole arms 330-1 and 330-2 of first dipole radiator 322-1 are center fed by the first RF transmission line 312-1 and radiate together at a first polarization. In the depicted embodiment, the first dipole radiator 322-1 is designed to transmit signals having a −45° polarization. Dipole arms 330-3 and 330-4 of second dipole radiator 322-2 are center fed by a second RF transmission line 312-2 and radiate together at a second polarization that is orthogonal to the first polarization. The second dipole radiator 322-2 is designed to transmit signals having a +45° polarization. The dipole arms 330 may be mounted approximately 3/16 to 1/4 an operating wavelength forwardly of the reflector 210 by the feed stalks 310 in example embodiments.

Referring again to FIG. 2, it can be seen that the low-band radiating elements 222 (300) extend farther forwardly from the reflector 210 than do the first and second mid-band radiating elements 232, 242. In order to keep the width of the base station antenna 100 relatively narrow, the low-band radiating elements 222 (300) may be located in very close proximity to both the first mid-band radiating elements 232 and the second mid-band radiating elements 242. In the depicted embodiment, each low-band radiating element 222 (300) may overlap two first mid-band radiating elements 232 and two second mid-band radiating elements 242. This arrangement allows for a significant reduction in the width of the base station antenna 100.

While positioning the low-band radiating elements 222 (300) so that they overlap the mid-band radiating elements 232, 242 may advantageously facilitate reducing the width of the base station antenna 100, this approach may significantly increase the coupling of RF energy transmitted by the mid-band radiating elements 232, 242 onto the low-band radiating elements 222 (300), and such coupling may degrade the antenna beams formed by the arrays 230, 240 of mid-band radiating elements 232, 242.

In order to reduce such coupling, the low-band radiating elements 300 may be designed to have dipole arms 330 that are substantially "transparent" to radiation emitted by both the first mid-band radiating elements 232 and the second mid-band radiating elements 242. This may be challenging, as the mid-band radiating elements 232 may operate over a wide frequency band. Herein, a dipole arm of a radiating element that is configured to transmit RF energy in a first frequency band is considered to be "transparent" to RF energy in a second, different frequency band RF energy if the RF energy in the second frequency band poorly couples to the dipole arm. Accordingly, if a dipole arm of a first radiating element that is transparent to a second frequency band is positioned so that it overlaps a second radiating element that transmits in the second frequency band, the addition of the first radiating element will not materially impact the antenna pattern of the second radiating element.

Referring to FIGS. 3C and 3D, each dipole arm 330 includes first through fourth segments 340-1 through 340-4. Each segment 340 includes a widened conductive section 342 that is surrounded by a narrowed conductive section 344. Each widened conductive section 342 is separated from its associated narrowed conductive section 344 by a gap 346 where no metallization is present. Additionally, each segment 340 is connected to the segments 340 adjacent thereto by narrowed conductive connectors 348. In particular, segment 340-1 is connected to segment 340-2 by a first narrowed conductive connector 348-1, segment 340-2 is connected to segment 340-3 by a second narrowed conductive connector 348-2, and segment 340-3 is connected to segment 340-4 by a third narrowed conductive connector 348-3. The first narrowed conductive connector 348-1 connects the widened conductive section 342 of the first segment 340-1 to the widened conductive section 342 of the second segment 340-2.

Thus, the first narrowed conductive connector 348-1 physically and electrically connects the widened conductive section 342 of the first segment 340-1 to the narrowed conductive section 344 of the first segment 340-1, physically and electrically connects the narrowed conductive section 344 of the first segment 340-1 to the narrowed conductive section 344 of the second segment 340-2, and physically and electrically connects the narrowed conductive section 344 of the second segment 340-2 to the widened conductive section 342 of the second segment 340-2. Similarly, the third narrowed conductive connector 348-3 physically and electrically connects the widened conductive section 342 of the third segment 340-3 to the narrowed conductive section 344 of the third segment 340-3, physically and electrically connects the narrowed conductive section 344 of the third segment 340-3 to the narrowed conductive section 344 of the fourth segment 340-4, and physically and electrically connects the narrowed conductive section 344 of the fourth segment 340-4 to the widened conductive section 342 of the fourth segment 340-4. In contrast, the second narrowed conductive connector 348-2 only connects the narrowed conductive section 344 of the second segment 340-2 to the narrowed conductive section 344 of the third segment 340-3, and does not connect to the widened conductive section 342 of either the second or third segments 340-2, 340-3.

FIG. 3D illustrates one of the segments 340 in greater detail. As shown in FIG. 3D, the segment 340 includes the widened conductive section 342 and the narrowed conductive section 344. The widened conductive section 342 may comprise a rectangular metallized region. The major axis of the rectangular metallized region may be coincident with a major axis the dipole arm 330 that the widened conductive section 342 is part of. Each narrowed conductive section 344 may comprise an annular rectangular structure that surrounds a respective one of the widened conductive sections 342. In the depicted embodiment, each dipole arm 330 includes four segments 340 that are aligned along a longitudinal axis of the dipole arm 330.

The widened conductive section 342 and its associated (here, substantially surrounding) narrowed conductive section 344 together form a metamaterial resonator 350. A variety of different metamaterial resonators are known in the art. One class of metamaterial resonators are ring-based metamaterial resonators, which are referred to herein as "metamaterial ring resonators." Two known types of metamaterial ring resonators are split ring resonators and complementary split ring resonators. A split ring resonator consists of a pair of concentric metallic rings (also called loops), which are usually formed by etching a metal layer on a dielectric substrate (e.g., using printed circuit board fabrication techniques). Slits may be formed on opposite sides of the rings. The rings may be square, circular, oval, rectangular or any other appropriate shape. A small gap is provided between the two rings. Magnetic flux that is incident on the split ring resonator induces rotating currents in the rings, and in response to the currents, the rings produce their own flux to enhance or oppose the incident electromagnetic field (depending on the resonant properties of the split ring resonator). The small gaps between the rings produce large capacitance values which lower the resonating frequency, which allows split ring resonators to act as if they are electrically smaller (as compared to their physical size) when responding to RF energy. The equivalent circuit of a single split ring resonator is shown in FIG. 3E, where L stands for the inductive coupling and C stands for the capacitive coupling. The resonant frequency of the split ring resonator is:

$$f_r = \frac{1}{2\pi\sqrt{LC}}$$

A complementary split ring resonator is a complementary structure to a split ring resonator. Thus, a complementary split ring resonator may be formed by providing a metal layer and then removing the metal to form a non-metallized region having the shape of a split ring resonator. In other words, a complementary split ring resonator is the negative image of the above-described split ring resonator. Embodiments of the present invention are primarily illustrated herein as being implemented as complementary split ring resonators. Using complementary split ring resonators to form the dipole arms may be convenient because metallization is provided that can easily be used to electrically connect the multiple complementary split ring resonators to form the dipole arm.

As shown in FIGS. 3A and 3C, each segment 340 of each dipole arm 330 of radiating element 300 is implemented as a complementary split ring resonator 350 (although it will be appreciated that other metamaterial resonators could be used). The complementary split ring resonator 350 has a resonant frequency. As such, each segment 340 may act like a bandstop filter that does not pass RF energy in a frequency range centered around the resonant frequency of the segment 340. Thus, by designing the complementary split ring resonators 350 to have resonant frequencies within the second operating frequency band, the dipole arms 330 may be substantially transparent to RF signals in the second operating frequency band. In order to widen the frequency range where the dipole arms 330 will be substantially transparent to RF signals, the resonant frequencies of the complementary split ring resonators 350 may be designed to have different resonant frequencies which may be spaced apart over the second operating frequency band. For example, if the second operating frequency band is the 1427-2690 MHz frequency band, the resonant frequencies for the complementary split ring resonators 350 that form each dipole arm 330 might be selected to be at, for example, 1675 MHz, 1925 MHz, 2175 MHz and 2425 MHz. The resonant frequency of each complementary split ring resonator 350 may be adjusted by varying the inductance and/or the capacitance thereof. For example, the resonant frequency may be varied by changing the length of each section while keeping all other parameters constant.

In the depicted embodiment, each complementary split ring resonator 350 is formed as a metallization pattern on a first side of the dipole radiator printed circuit board 320. It will be appreciated, however, that embodiments of the present invention are not limited thereto. For example, in other embodiments, the complementary split ring resonators 350 may be implemented on both sides of the dielectric substrate 326 of the dipole radiator printed circuit board 320. This may allow for larger capacitance values, particularly if the dipole radiator printed circuit board 320 has a relatively thin dielectric substrate 326. In some embodiments, the same metallization pattern may be printed on both sides of the dipole radiator printed circuit board 320, and the metallization patterns may be capacitively or galvanically coupled.

The radiating elements according to embodiments of the present invention may exhibit improved performance as compared to conventional cloaking low-band radiating elements. For example, a radiating element according to embodiments of the present invention having the same size as a conventional cloaking radiating element may exhibit a narrower azimuth 3 dB beamwidth and may exhibit improved cross-polarization performance.

FIGS. 3A-3E illustrate one example radiating element according to embodiments of the present invention. It will be appreciated, however, that the radiating elements according to embodiments of the present invention may be implemented using a wide variety of complementary split ring resonator designs. For example, FIGS. 4A-6B illustrate three additional radiating elements according to embodiments of the present invention that are implemented using different complementary split ring resonator designs.

Figure 4A:
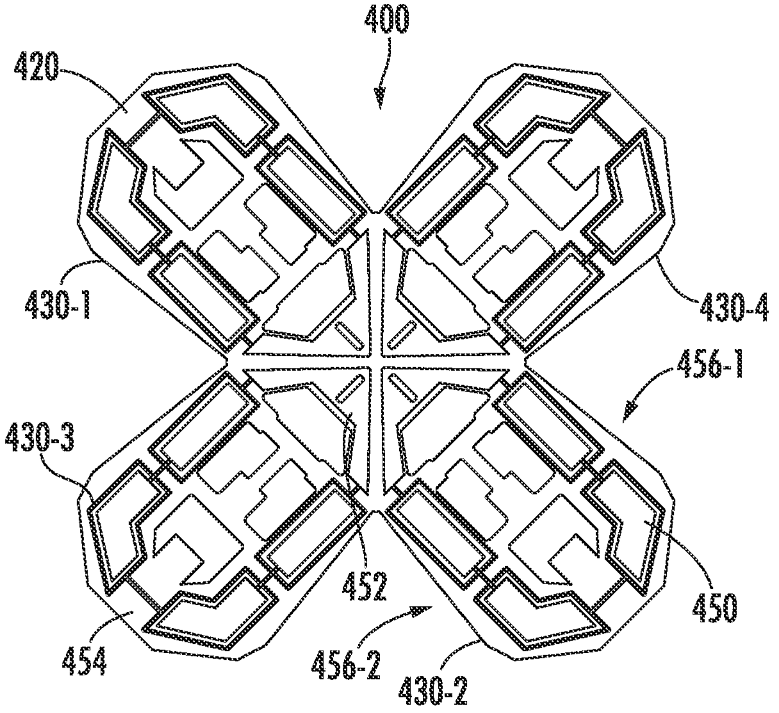
FIG. 4A is a plan view of a radiating element according to further embodiments of the present invention.
Figure 4B:
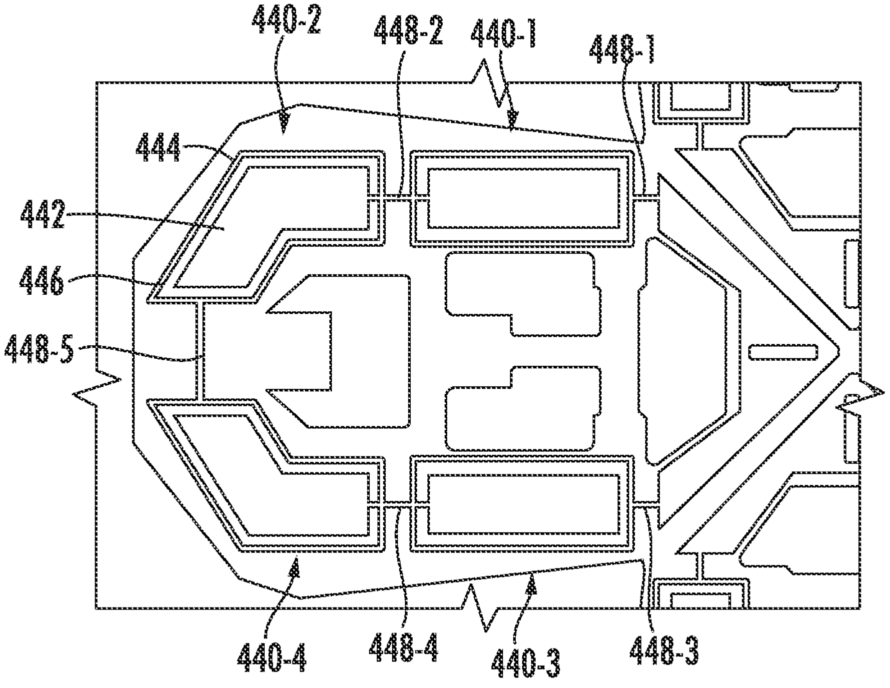
FIG. 4B is an enlarged plan view of one of the complementary split ring resonators included in the dipole arms of the radiating element of FIG. 4A.

FIG. 4A is a plan view of a radiating element 400 according to further embodiments of the present invention. FIG. 4B is an enlarged plan view of one of the complementary split ring resonators included in the dipole arms of the radiating element of FIG. 4A.

Referring to FIG. 4A, a radiating element 400 includes a dipole radiator printed circuit board 420 that has dipole arms 430-1 through 430-4 that are each formed as a closed loop. In the embodiment of FIG. 4A, each dipole arm 430 includes four sections 440-1 through 440-4, where each section 440 is implemented as a complementary split ring resonator 450. As shown best in FIG. 4B, each dipole arm 430 may have a generally oval shape and may have a base 452 that is in the center of the dipole radiator printed circuit board 420 and a distal end 454. Two current paths 456-1, 456-2 are provided between the base 452 and the distal end 454 of the dipole arm 430. Two complementary split ring resonators 450 are provided along each current path 456-1, 456-2. A first narrowed conductive connector 448-1 connects the base 452 of the dipole arm 430 to the first complementary split ring resonator 450-1 and a second narrowed conductive connector 448-2 connects the first complementary split ring resonator 450-1 to the second complementary split ring resonator 450-2. Similarly, a third narrowed conductive connector 448-3 connects the base 452 of the dipole arm 430 to the third complementary split ring resonator 450-3 and a fourth narrowed conductive connector 448-4 connects the third complementary split ring resonator 450-3 to the fourth complementary split ring resonator 450-4. A fifth narrowed conductive connector 448-5 connects the second complementary split ring resonator 450-2 to the fourth complementary split ring resonator 450-4. All four dipole arms 430-1 through 430-4 may have the same design.

Radiating element 400 of FIG. 4A may have a smaller "footprint" than the radiating element 300. Herein, the "footprint of a radiating element refers to the area of the smallest square that will enclose the radiating element when viewed from the front. Since loops are used in radiating element 400 that have two current paths 456, the physical "length" of the dipole arms 430 (where the physical length refers to how far the dipole arm 430 extends outwardly from the center of the radiating element 400) may be less than the length of the dipole arms 330 in radiating element 300, even though the dipole arms in both radiating elements may have the same electrical length.

The complementary split ring resonators 450 included in radiating element 400 are similar to those used in radiating element 300, but the second and fourth complementary split ring resonators 450-2, 450-4 have different (non-square) shapes in radiating element 400 in order to form the generally oval shaped dipole arms 430. Each complementary split ring resonator 450 in a given dipole arm 430 of radiating element 400 may be designed to have a different resonant frequency. In some embodiments, the resonant frequencies of the complementary split ring resonator 450 may be "spread" across the operating frequency band of higher band radiating elements that are also included in the antenna that includes radiating element 400 (or any of the other lower-band radiating elements disclosed herein). Herein, the resonant frequencies are considered to be "spread" across an operating frequency band of another higher-band radiating element if each resonant frequency is separated from the other resonant frequencies by at least X, where X is determined as follows:

$$X = \text{Operating Frequency Band}/(N+2)$$

where N=the number of complementary split ring resonators included in each dipole arm of the radiating element.

Thus, for example, if the higher-band radiating element is configured to operate in the 1427-2690 MHz frequency band, and the lower-band radiating element includes four complementary split ring resonators per dipole arm, then the resonant frequencies of the complementary split ring resonators would be considered to be "spread" across the operating frequency band of the higher-band radiating element so long as each resonant frequency was separated from the other three resonant frequencies by (2690 MHz-1427 MHz)/(4+2)=210.5 MHz. Thus, for example, if the complementary split ring resonators had resonant frequencies of 1600 MHz, 1900 MHz, 2200 MHz and 2500 MHz they would be considered to be "spread" across the operating frequency band of the higher-band radiating element.

Figure 5A:
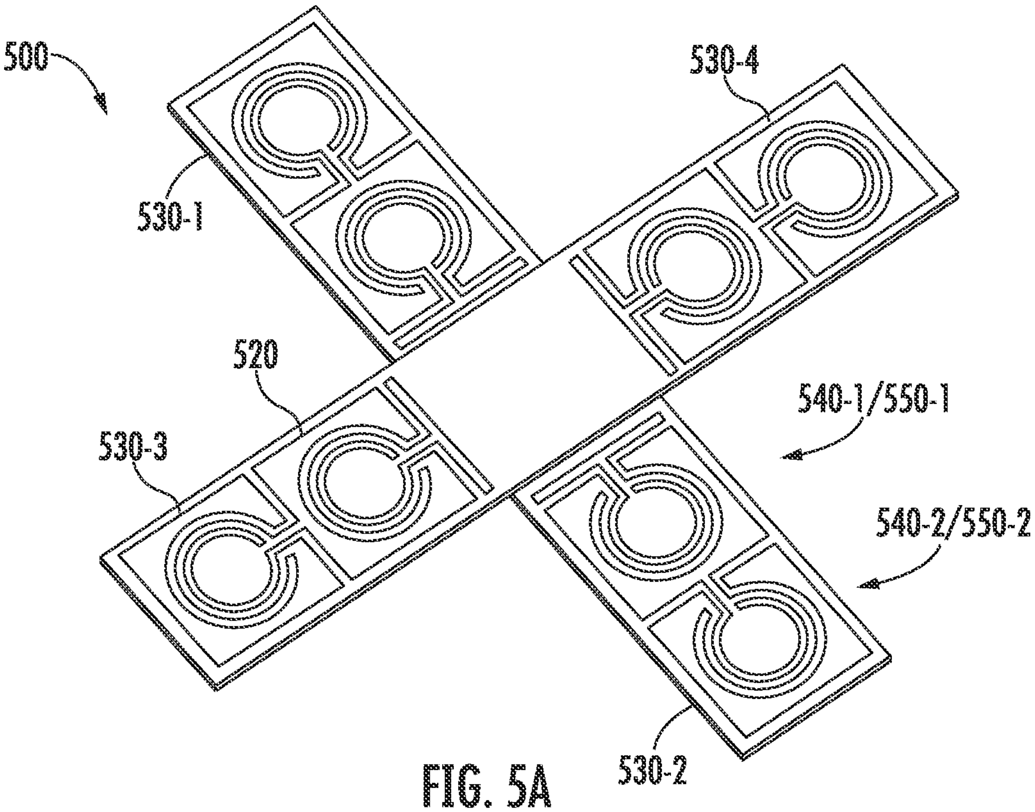
FIG. 5A is a plan view of a radiating element according to still further embodiments of the present invention.
Figure 5B:
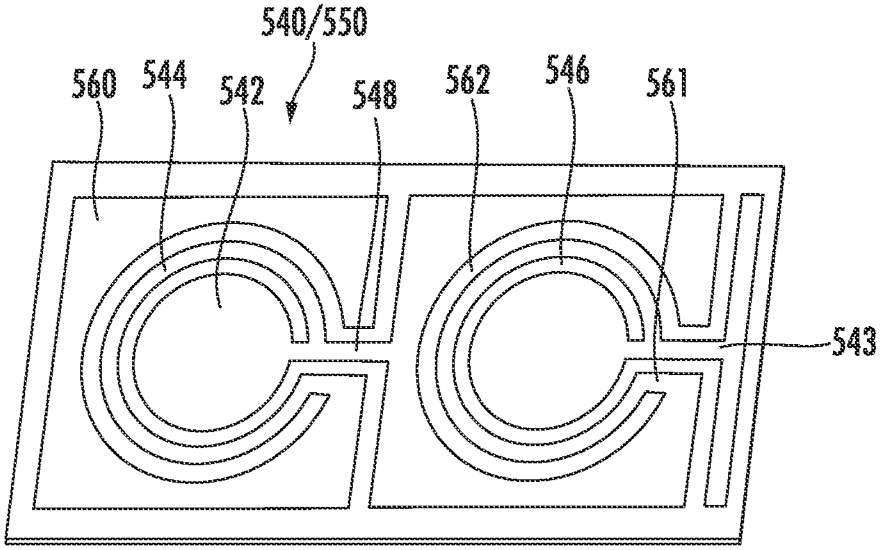
FIG. 5B is an enlarged plan view of one of the complementary split ring resonators included in the dipole arms of the radiating element of FIG. 5A.

FIG. 5A is a plan view of a radiating element 500 according to further embodiments of the present invention. FIG. 5B is an enlarged plan view of one of the complementary split ring resonators included in the dipole arms of the radiating element of FIG. 5A.

Referring to FIG. 5A, a radiating element 500 includes a dipole radiator printed circuit board 520 that has dipole arms 530-1 through 530-4. Each dipole arm 530 includes two sections 540-1, 540-2, where each section 540 is implemented as a complementary split ring resonator 550. The radiating element 500 is similar to radiating element 300 except that (1) radiating element 500 only includes two sections 540 per dipole arm and (2) a different a complementary split ring resonator design is used in radiating element 500. As shown best in FIG. 5B, each a complementary split ring resonator 550 comprises an inner widened conductive section 542 that is substantially surrounded by a narrowed conductive section 544. The inner widened conductive section 542 is separated from its associated narrowed conductive section 544 by a gap 546 where no metallization is present. A first narrow metallized connection 543 is provided that galvanically connects a base of the dipole arm 530 to the inner widened conductive section 542 and further connects the inner widened conductive section 542 to its associated narrowed conductive section 544. The inner widened conductive section 542 has a generally circular shape, and the narrowed conductive section 544 substantially forms a concentric circle that substantially surrounds the inner widened conductive section 542. The complementary split ring resonator 550 further includes an outer conductive region 560 that substantially surrounds the narrowed conductive section 544. The outer conductive region 560 is separated from the narrowed conductive section 544 by a second gap 562. A second narrow metallized connection 561 is provided that galvanically connects narrowed conductive section 544 to the outer conductive region 560.

Referring again to FIG. 5A, the first (inner) complementary split ring resonator 550 in each dipole arm 530 is connected to the second (outer) complementary split ring resonator 550 in the dipole arm 530 by a narrowed conductive connector 548. The narrowed conductive connector 548 also acts as the first narrow metallized connection 543. Thus, the narrowed conductive connector 548 connects the outer conductive region 560 of the first complementary split ring resonator 550 to the inner widened conductive section 542 of the second complementary split ring resonator 550.

Figure 6A:
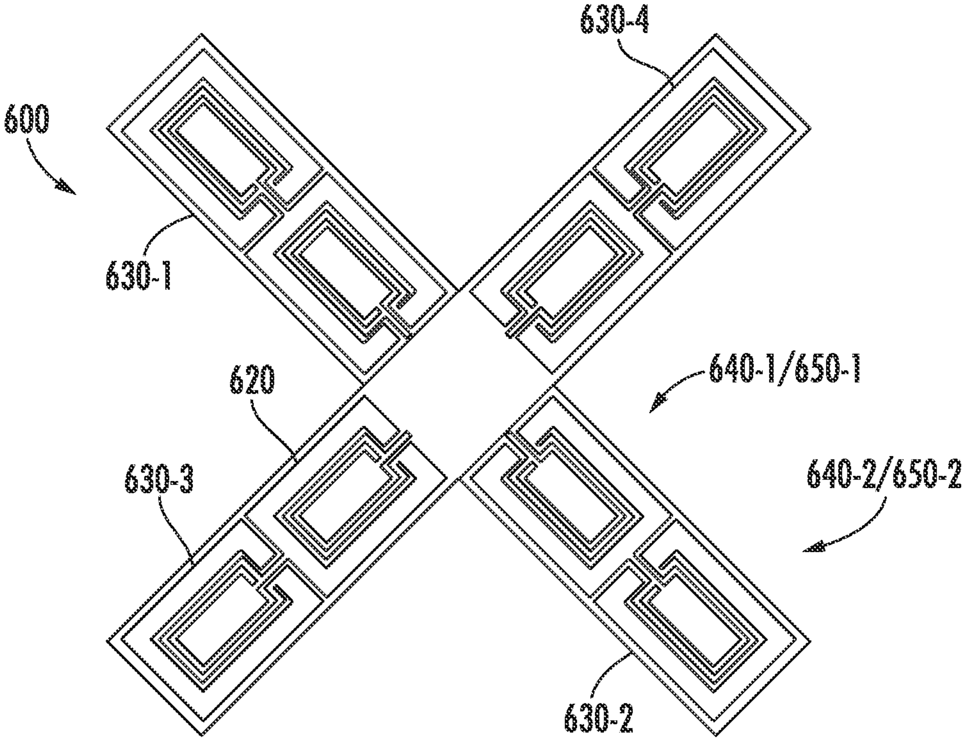
FIG. 6A is a plan view of a radiating element according to additional embodiments of the present invention.
Figure 6B:
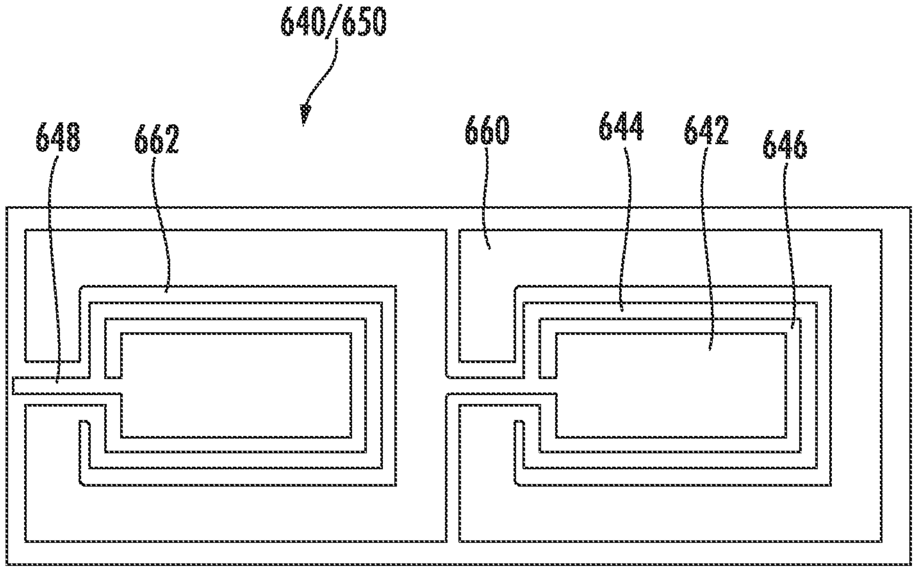
FIG. 6B is an enlarged plan view of one of the complementary split ring resonators included in the dipole arms of the radiating element of FIG. 6A.

FIG. 6A is a plan view of a radiating element 600 according to additional embodiments of the present invention. FIG. 6B is an enlarged plan view of one of the complementary split ring resonators included in the dipole arms of the radiating element of FIG. 6A.

Referring to FIG. 6A, a radiating element 600 includes a dipole radiator printed circuit board 620 that has dipole arms 630-1 through 630-4. Each dipole arm 630 includes two sections 640-1, 640-2, where each section 640 is implemented as a complementary split ring resonator 650. The radiating element 600 is similar to radiating element 500 except that a different a complementary split ring resonator design is used in radiating element 600. As shown in FIG. 6B, each complementary split ring resonator 650 comprises an inner widened conductive section 642 that is surrounded by a narrowed conductive section 644. The inner widened conductive section 642 is separated from its associated narrowed conductive section 644 by a gap 646 where no metallization is present. The inner widened conductive section 642 has a generally rectangular shape, and the narrowed conductive section 644 substantially forms a concentric rectangle that surrounds the inner widened conductive section 642. The complementary split ring resonator 650 further includes an outer conductive region 660 that substantially surrounds the narrowed conductive section 644. The outer conductive region 660 is separated from the narrowed conductive section 644 by a second gap 662. The first (inner) complementary split ring resonator 650 in each dipole arm is connected to the second (outer) complementary split ring resonator 650 by a narrowed conductive connectors 648. Each narrowed conductive connector 648 connects the outer conductive region 660 of the first complementary split ring resonator 650 to the inner widened conductive section 642 of the second complementary split ring resonator 650.

The antennas according to embodiments of the present invention have lower band radiating elements that have dipole arms that are formed by electrically connecting a plurality of metamaterial resonators. The metamaterial resonators may have resonant frequencies that are within the operating frequency band of a higher band array included in the antenna so that the dipole arms will pass low-band currents in the operating frequency band of the lower band radiating elements while appearing substantially transparent to RF energy in the operating frequency band of the higher band radiating elements. Moreover, each dipole arm included in the lower band radiating elements may have at least two metamaterial resonators that have different resonant frequencies, so as to widen the bandwidth over which the dipole arm will suppress current formation.

While the example embodiments discussed above implement the metamaterial resonators as complementary split ring resonators, it will be appreciated that embodiments of the present invention are not limited thereto. For example, in other embodiments, the complementary split ring resonators shown above may be replaced with split ring resonators that are electrically connected to each other (e.g., by traces on the rear side of the dipole radiator printed circuit board. It will also be appreciated that metamaterial resonators other than metamaterial ring resonators may be used in still further embodiments.

Figure 7A:
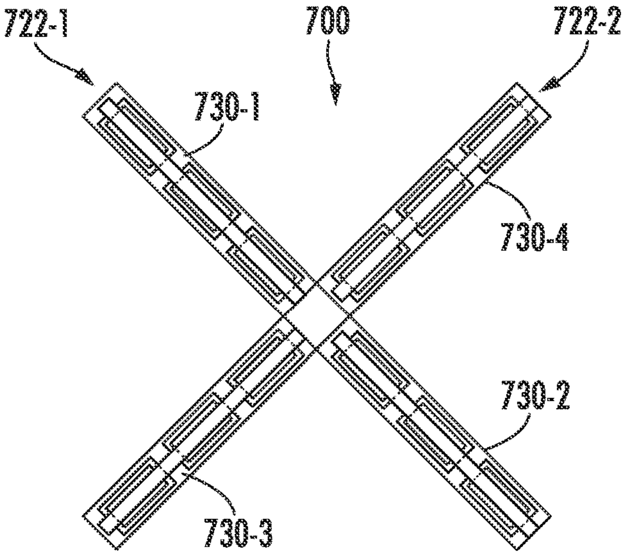
FIG. 7A is a schematic front view of a radiating element according to additional embodiments of the present invention that has dipole arms that each include a plurality of serially connected split ring resonators.
Figure 7B:
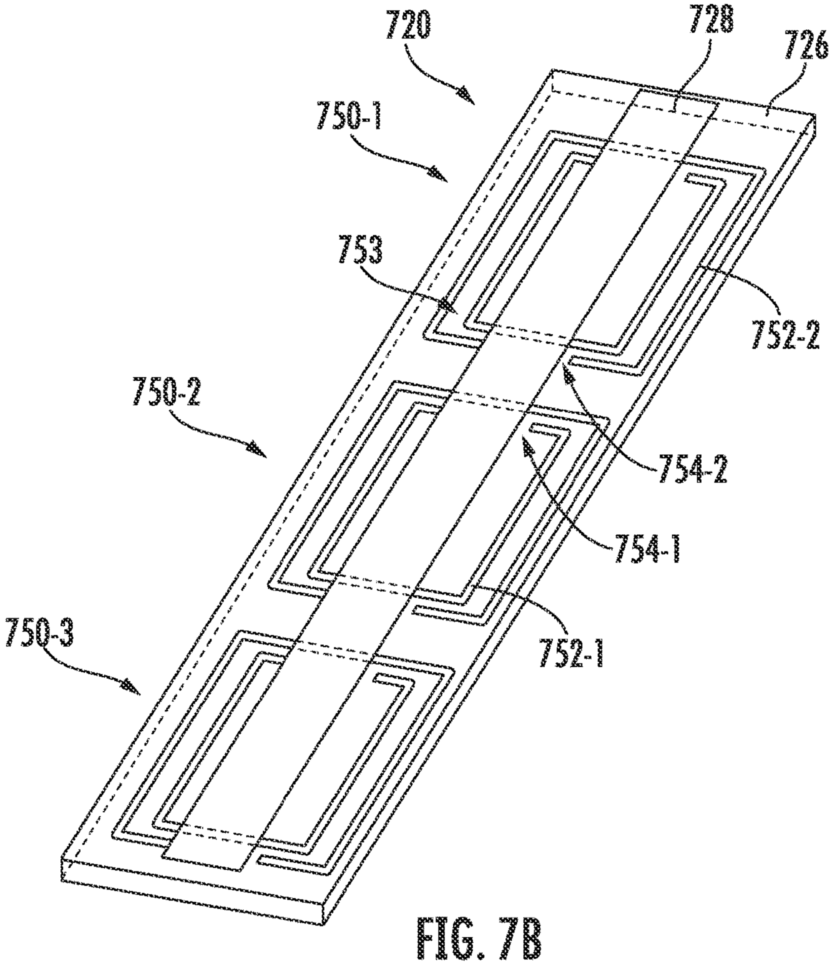
FIG. 7B is a schematic perspective view of one of the dipole arms of the radiating element of FIG. 7A.

FIGS. 7A-7B illustrate a radiating element 700 according to further embodiments of the present invention that is implemented using dipole arms that each include a plurality of split ring resonators. In particular, FIG. 7A is a schematic front view of the radiating element 700, and FIG. 7B is a schematic perspective view of one of the dipole arms of radiating element 700. Radiating element 700 may be used, for example, in place of low-band radiating elements 222 in base station antenna 100 described above. Radiating element 700 may, for example, be configured to transmit and receive signals across the 694-960 MHz frequency band, and may, for example, generate antenna beams having azimuth half power beamwidths in the range of 55 degrees to 85 degrees. While not shown in FIGS. 7A-7B, radiating element 700 includes a pair of feed stalks which may, for example, be identical to the feed stalks 310 of radiating element 300 that are discussed above.

As shown in FIG. 7A, the radiating element 700 includes first and second dipole radiators 722-1, 722-2 are formed on the dipole radiator printed circuit board 720 (which may comprise a single printed circuit board or multiple printed circuit boards). The first dipole radiator 722-1 includes first and second dipole arms 730-1, 730-2, and the second dipole radiator 722-2 includes third and fourth dipole arms 730-3, 730-4. The dipole radiators 722-1, 722-2 are implemented in a “cross” arrangement to form a pair of center-fed slant +/−45° dipole radiators 722. RF signals may be galvanically or capacitively coupled to and from the dipole radiators 722 via the feed stalks. The dipole radiator printed circuit board 720 includes a dielectric substrate 726 that has a first conductive layer 724 formed on a front side thereof and a second conductive layer 728 formed on a rear side thereof.

Each dipole arm 730 is formed using three split ring resonator 750-1, 750-2, 750-3 that are formed in the first conductive layer 724. The split ring resonators 750 are capacitively coupled together in series through a metal line 756 that is formed in the second conductive layer 728. Each split ring resonator 750 has a resonant frequency, and hence may act like a bandstop filter that does not pass RF energy in a frequency range centered around the resonant frequency of the split ring resonator 750. Each split ring resonator 750 may be designed, for example, to have a resonant frequency within a second operating frequency band of other radiating elements included in the base station antenna in which radiating element 700 is used. The dipole arms 730 may be substantially transparent to RF signals in the second operating frequency band of these other radiating elements. The resonant frequencies of the three split ring resonators 750 may be designed to have different resonant frequencies which may be spaced apart over the second operating frequency band in the manner discussed above with respect to radiating element 300.

Figure 7C:
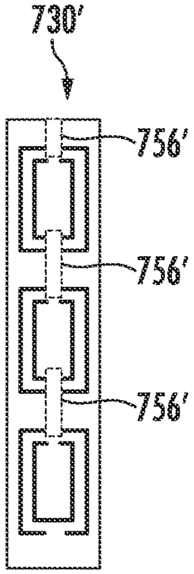
FIG. 7C is a schematic front view of an alternate version of a dipole arm that can be used in the radiating element of FIGS. 7A-7B.

As best seen in the enlarged view of FIG. 7B, each split ring resonator 750 consists of a pair of concentric metallic rings 752-1, 752-2 (also called loops). Slits 754-1, 7564-2 are formed on opposite sides of the respective rings 752-1, 752-2. The rings 752 may be square, circular, oval, rectangular or any other appropriate shape. The two rings 752 are separated by a small gap 753. Magnetic flux that is incident on each split ring resonator 750 induces rotating currents in the rings 752, and in response to the currents, the rings 752 produce their own flux to oppose the incident electromagnetic field. The small gaps 753 between the rings 752 produce large capacitance values which lower the resonating frequency, which allows the split ring resonators 750 to act as if they are electrically smaller (as compared to their physical size) when responding to RF energy. The metal line 756 electrically connects the three split ring resonators in series. While a continuous metal line 756 is illustrated in FIGS. 7A-7B, it will be appreciated that in other embodiments a segmented metal line may be provided. FIG. 7C schematically shows an alternate dipole arm 730' that can be used in place of the dipole arms 730 that includes such a segmented metal line 756'. RF energy in the low-band frequency band will induce currents that flow along the length of the dipole arm 730. RF energy in the second operating frequency band may be substantially cancelled by the split ring resonators 750.

While the dipole arms of the low-band radiating elements described above are implemented on one or more dipole radiator printed circuit boards, it will be appreciated that embodiments of the present invention are not limited thereto. For example, in other embodiments, any of the above-described radiating elements may be implemented using sheet metal dipole arms that are mounted on a dielectric support. In such embodiments, the split ring resonators or complementary split ring resonators of each of the above-described radiating elements may be formed by stamping the appropriately shaped structures from sheet metal. The sheet metal-formed complementary split ring resonators may then be mounted on a dielectric substrate to form each dipole arm.

While the example embodiments described above have low-band radiating elements that are designed to be transparent to RF energy radiated in two higher frequency bands, it will be appreciated that embodiments of the present invention are not limited thereto. For example, in other embodiments, mid-band radiating elements may be provided that have first dipole arms that are configured to be substantially transparent to RF energy in a lower frequency band and second dipole arms that are configured to be substantially transparent to RF energy in a higher frequency band.

Embodiments of the present invention have been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term “and/or” includes any and all combinations of one or more of the associated listed items.

It will be understood that when an element is referred to as being “on” another element, it can be directly on the other element or intervening elements may also be present. In contrast, when an element is referred to as being “directly on” another element, there are no intervening elements present. It will also be understood that when an element is referred to as being “connected” or “coupled” to another element, it can be directly connected or coupled to the other element or intervening elements may be present. In contrast, when an element is referred to as being “directly connected” or “directly coupled” to another element, there are no intervening elements present. Other words used to describe the relationship between elements should be interpreted in a like fashion (i.e., “between” versus “directly between”, “adjacent” versus “directly adjacent”, etc.).

Relative terms such as “below” or “above” or “upper” or “lower” or “horizontal” or “vertical” may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the invention. As used herein, the singular forms “a”, “an” and “the” are intended to include the plural forms as well, unless the context clearly indicates otherwise. It will be further understood that the terms “comprises” “comprising,” “includes” and/or “including” when used herein, specify the presence of stated features, operations, elements, and/or components, but do not preclude the presence or addition of one or more other features, operations, elements, components, and/or groups thereof.

Aspects and elements of all of the embodiments disclosed above can be combined in any way and/or combination with aspects or elements of other embodiments to provide a plurality of additional embodiments.

That which is claimed is:

1. An antenna, comprising:

a reflector;

a first radiating element extending forwardly from the reflector that is configured to operate in a first operating frequency band; and a second radiating element extending forwardly from the reflector that is configured to operate in a second operating frequency band that encompasses higher frequencies than the first operating frequency band;

wherein the first radiating element includes a first dipole radiator having a first dipole arm and a second dipole arm and a second dipole radiator having a third dipole arm and a fourth dipole arm, and wherein the first dipole arm includes a first widened conductive section and a first narrowed conductive section that at least substantially surrounds the first widened conductive section, and a gap where no conductive material is present extends substantially around the first widened conductive segment to substantially separate the first widened conductive section from the first narrowed conductive section.

2. The antenna of claim 1, wherein the first dipole arm further includes a second widened conductive section and a second narrowed conductive section that at least substantially surrounds the second widened conductive section, where the second widened conductive section is substantially separated from the second narrowed conductive section by a gap where no conductive material is present.

3. The antenna of claim 2, wherein the first widened conductive section and the first narrowed conductive section that at least substantially surrounds the first widened conductive section are at least part of a first complementary split ring resonator, the second widened conductive section and the second narrowed conductive section that at least substantially surrounds the second conductive widened section are at least part of a second complementary split ring resonator, and the first complementary split ring resonator is electrically connected to the second complementary split ring resonator.

4. The antenna of claim 3, wherein the first complementary split ring resonator has a first length and the second complementary split ring resonator has a second length that exceeds the first length.

5. The antenna of claim 3, wherein a first resonant frequency of the first complementary split ring resonator is within the second operating frequency band and a second resonant frequency of the second complementary split ring resonator is within the second operating frequency band, the second resonant frequency being different than the first resonant frequency.

6. The antenna of claim 5, wherein the first resonant frequency is within a lower half of the second operating frequency band and the second resonant frequency is within an upper half of the second operating frequency band.

7. The antenna of claim 6, wherein the first dipole arm further includes a third complementary split ring resonator that is electrically connected to the first and second complementary split ring resonators, and a third resonant frequency of the third complementary split ring resonator is within the second operating frequency band and is different than both the first resonant frequency and the second resonant frequency.

8. The antenna of claim 7, wherein a first narrowed conductive connector connects the first complementary split ring resonator to the second complementary split ring resonator, and a second narrowed conductive connector connects the second complementary split ring resonator to the third complementary split ring resonator.

9. The antenna of claim 8, wherein the third complementary split ring resonator includes a third widened conductive section and a third narrowed conductive section that at least substantially surrounds the third widened conductive section, and wherein the first narrowed conductive connector connects both the first widened conductive section and the first narrowed conductive section to both the second widened conductive section and the second narrowed conductive section, and the second narrowed conductive connector only connects the second narrowed conductive section to the third narrowed conductive section.

10. The antenna of claim 1, wherein the first widened conductive section and the first narrowed conductive section that at least substantially surrounds the first widened conductive section form a parallel inductor-capacitor ("LC") circuit, and the parallel LC circuit acts as an open circuit at a frequency within the second operating frequency band.

11. The antenna of claim 1, wherein the first widened conductive section comprises a perimeter that is filled with a conductive material, and a width of the first widened conductive section is at least three times a width of the first narrowed conductive section.

12. The antenna of claim 11, wherein the first narrowed conductive section surrounds the first widened conductive section when the first radiating element is viewed from the front.

13. The antenna of claim 11, wherein the first narrowed conductive section comprises a conductive ring, and a conductive connector extends from an inner side of the conductive ring to connect to the first widened conductive section.

14. The antenna of claim 1, wherein the first widened conductive section and the first narrowed conductive section are both implemented in a first metal layer of a printed circuit board, and wherein the printed circuit board includes first and second metallization layers that are separated by a dielectric substrate, and wherein the first and second metallization layers each include at least a portion of a complementary split ring resonator.

15. An antenna, comprising a reflector;

a first radiating element extending forwardly from the reflector that is configured to operate in a first operating frequency band; and a second radiating element extending forwardly from the reflector that is configured to operate in a second operating frequency band that encompasses higher frequencies than the first operating frequency band;

wherein the first radiating element includes a first dipole radiator having a first dipole arm and a second dipole arm and a second dipole radiator having a third dipole arm and a fourth dipole arm, and wherein each of the first through fourth dipole arms includes at least one of a split ring resonator or a complimentary split ring resonator.

16. The antenna of claim 15, wherein each complementary split ring resonator includes a widened conductive section and a narrowed conductive section that at least substantially surrounds the widened conductive section, where the widened conductive section is substantially separated from the narrowed conductive section by a gap where no conductive material is present.

17. The antenna of claim 16, wherein a width of the widened conductive section is at least three times a width of the narrowed conductive section.

18. The antenna of claim 15, wherein each complementary split ring resonator includes a widened conductive section, a narrowed conductive section that at least substantially surrounds the widened conductive section, and a conductive region that substantially surrounds the narrowed conductive section.

19. The antenna of claim 15, wherein each complementary split ring resonator acts as an open circuit at a frequency within the second operating frequency band.

20. The antenna of claim 15, wherein each dipole arm includes at least two split ring resonators, and wherein a first of the split ring resonators on each dipole arm includes a first metal ring that has a first slit and a second metal ring that has a second slit, where the second metal ring substantially encloses the first metal ring.

21. The antenna of claim 20, wherein the first slit is on a first side of the first of the split ring resonators and the second slit is on a second side of the first of the split ring resonators, the second side being opposite the first side.

22. An antenna, comprising:

a reflector;

a first radiating element extending forwardly from the reflector that is configured to operate in a first operating frequency band; and a second radiating element extending forwardly from the reflector that is configured to operate in a second operating frequency band that encompasses higher frequencies than the first operating frequency band;

wherein the first radiating element includes a first dipole radiator having a first dipole arm and a second dipole arm and a second dipole radiator having a third dipole arm and a fourth dipole arm, and wherein the first dipole arm includes a conductive element and a conductive ring that surrounds the conductive element when the first dipole arm is viewed from the front, and a gap where no conductive material is present extends substantially around the conductive element to substantially separate the conductive element from the conductive ring.

23. The antenna of claim 22, a conductive connector extends from an inner side of the conductive ring to connect to the conductive element.

* * * * *